United States Patent Office

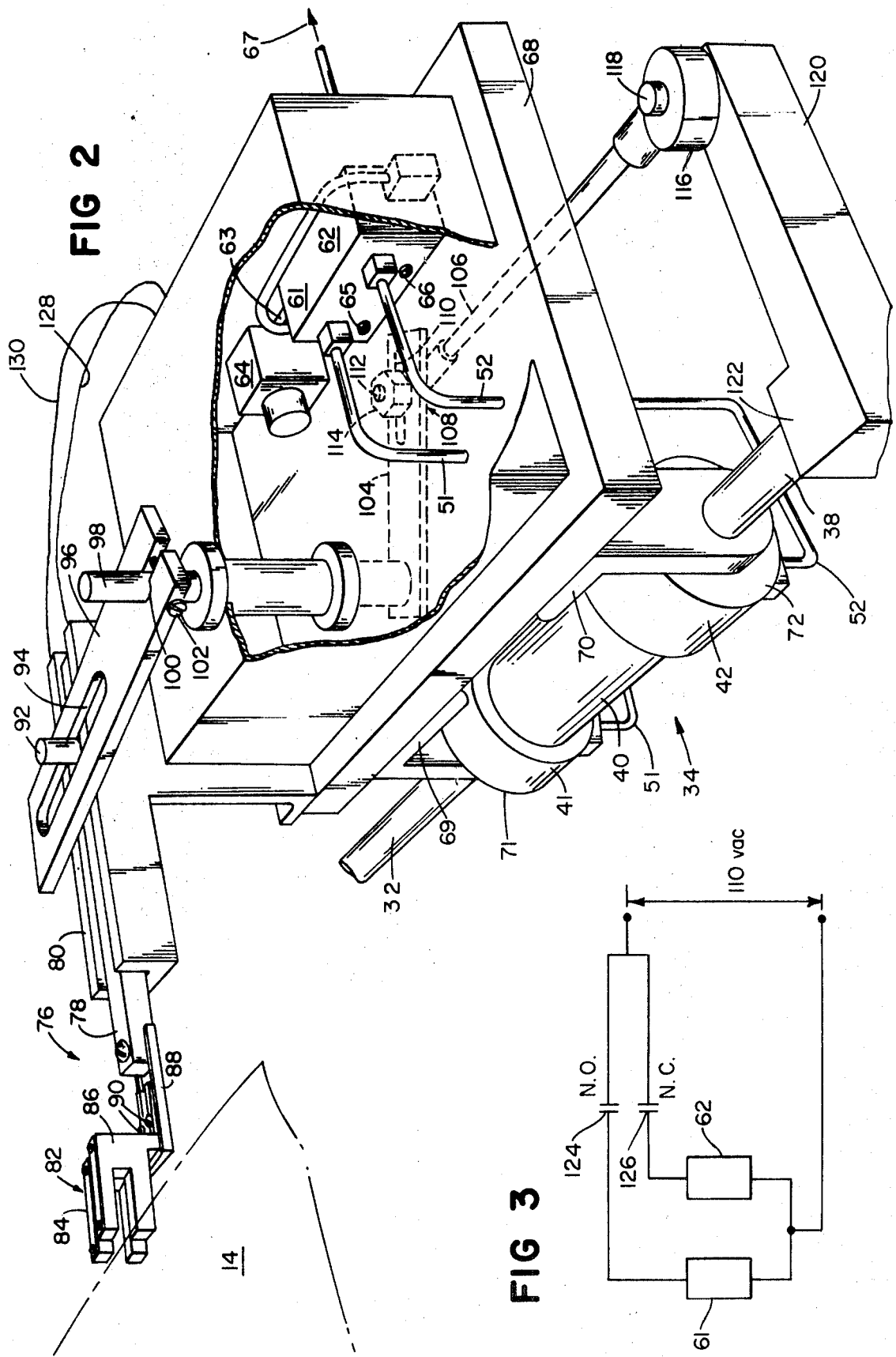

3,606,119
Patented Sept. 20, 1971

3,606,119
WEB REGISTRY CONTROL APPARATUS
John G. Callan, Sharon, Mass., assignor to
Knox, Inc., South Walpole, Mass.
Continuation-in-part of application Ser. No. 694,713,
Dec. 29, 1967, now Patent No. 3,504,835. This application Feb. 27, 1970, Ser. No. 15,063
Int. Cl. B65h 25/26
U.S. Cl. 226—20                                6 Claims

ABSTRACT OF THE DISCLOSURE

Apparatus is provided for detecting movements of a moving web out of registry with equipment operating thereon and for actuating adjustment mechanism to restore registry. The detector is designed to produce opposite actuation of the adjustment mechanism according to movements of the web from registry with a nul zone of the detector to registry with operating zones thereof at either side of the nul zone. The detector is mounted on a movable arm which is moved by feedback mechanism in proportion to adjustment actuation in the direction to restore registry of the nul zone with the web when a movement of the web away from such registry terminates. The feedback enables adjustment proportional to web movement with simple on-off type controls.

---

This invention concerns apparatus for controlling registry of a moving web with equipment such as feed rolls operating on the web. More particularly the invention concerns apparatus for detecting a lack of desired registry and for producing the requisite correctional action of adjustment equipment. This application is a continuation-in-part of my prior application Ser. No. 694,713, filed Dec. 29, 1967, now Pat. No. 3,504,835.

Apparauts of the type concerned includes a detector for sensing departures of a portion of the web such as its edge from a desired position and for causing appropriate correctional action by adjustment equipment. The departure sensed may be lateral as where longitudinal alignment is being controlled in which case the adjustment equipment is usually one or more rolls engaging the web which are moved to produce the corrective action. The departure sensed may also be from a desired plane as where feed tension is being controlled, in which case the adjustment may be made in the operating speed of feed or take-up rolls.

Various types of sensors are used depending on the nature of the web and other conditions, such as photocells or other light change detectors, pressure change detectors or mechanical feelers. The control which they exercise may be of the on-off type which calls for corrective adjustment upon departure of the fabric from a given position until it returns to that position. Such control has the advantage of simplicity but has the disadvantage of the likelihood of overcorrection. More sophisticated controls govern the extent of adjustment to make it proportional to the extent of wander of the web. Such controls have involved elaborate systems, usually electronic, for measuring the amount of web wander from a desired normal position in accordance with increases or decreases in light intensity or in pressure or in extent of movement of a mechanical feeler and for translating such detected changes into proportionate operation of the adjustment mechanism in the proper direction. The systems have been dependent upon and useful only with a particular type of sensor for which the system is designed.

The object of this invention is to provide apparatus of the type concerned of the proportional adjustment type which is simpler, less expensive and more reliable than prior systems and in which various types or detectors can be utilized.

Although in my apparatus the adjustment is proportional to the amount of web wander it utilizes simple detection and adjustment controls of the on-off type— that is, controls which call for continued operation of the adjustment mechanism so long as the web portion being detected remains outside a preselected zone of the detector. This zone may for example be the mid-point or a central portion of a photocell detector beam or of an air inlet to a pressure detector system. In order to make the adjustment by such a system nevertheless proportional to web wander, my apparatus provides position adjustability of this detection zone which is controlled by feedback of the extent of operation of the web adjustment mechanism, so that actually or in effect the zone tracks the web area being detected. In this way, web position correction adjustment continues proportionally so long as the web continues to wander in a given direction. When wander in that direction ceases, operation of the web adjustment mechanism terminates because the nul area of the detector zone has caught up with the web. When the web returns sufficiently toward the desired position to pass through the nul area, opposite correctional adjustment commences thereby reducing the corrective action that has been made on the web adjusting mechanism until the web and the web adjustment mechanism return to normal position.

The feedback may be mechanically, electrically or pneumatically controlled and is connected to a movable detector having a detector zone as above described which is operative or nul according to the position of the web edge with reference to it. As the web edge moves out of nul position the detector causes opposite web adjustment and feedback returns the movable detector toward its nul position with reference to the web which is reached when the web edge stops moving in the given direction. Thus, the sensing head is controlled by the feedback to track the web area with which it cooperates. The on-off type operating connections for the web adjustment mechanism, which is all that my system requires, may be quite simple such as two electric circuits connected for opposite actuation of the web adjustment controlling mechanism, each circuit having a normally open switch which is closed when the detector and the web move relatively to each other from the nul to the corresponding actuating position of the detector.

A feature of the invention is the simplicity and reliability of the feedback arrangement. In the accompanying drawings:

FIG. 2 is a perspective view, similar to FIG. 1, of the web-guiding assembly, with the housing partially broken away; and FIG. 3 is a diagram of the electric circuits of the web-guiding assembly.

Figure 1:
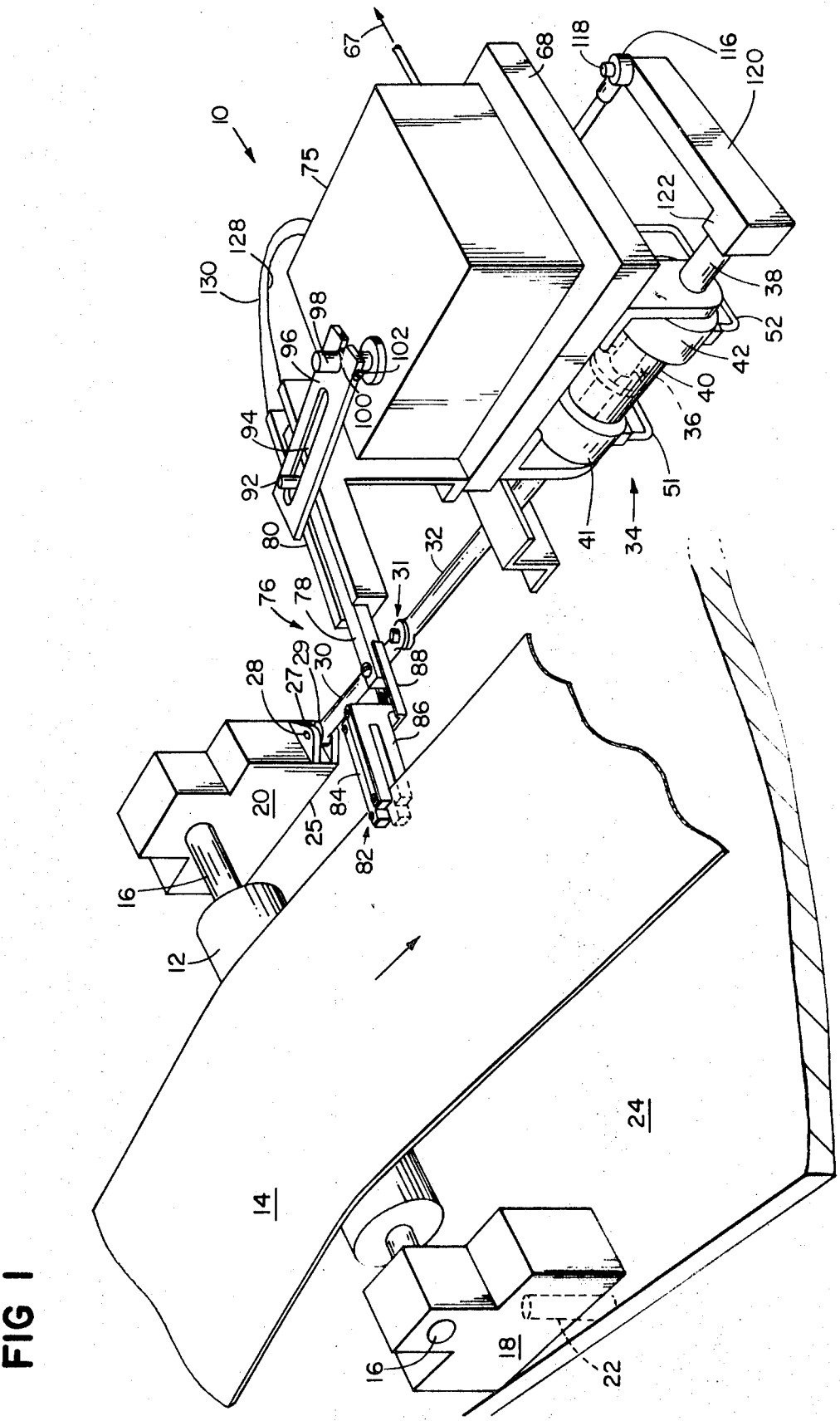
FIG. 1 is a perspective view, partially in section, of a web, roller assembly, and a web-guiding assembly embodying the present invention.

In FIG. 1, there is shown a web-guiding assembly 10 for pivoting roller 12 to control the lateral movement of web 14, moving in the direction indicated by the arrow. Roller 12 is mounted on roller shaft 16 which is mounted at one end in pivot block 18 and at the other end in sliding block 20. Roller 12 is transversely pivoted about pin 22 which is rotatably journalled into pivot block 18 and secured to support 24, in response to the movement of sliding block 20 on bearing surface 25 generally parallel to the direction of web 14, although slightly arcuate.

Connector 27 is mounted on block 20 and secures pin 28, which is rotatably received through spherical rod end 29. Link 30 is secured, through pivot joint 31 to first piston rod 32 of piston assembly 34 which is secured to piston head 36 and extends through the piston head to provide a coacting piston rod 38 at the opposite side of piston head 36. Rods 32 and 38 and piston head 36 are contained within actuating cylinder 40 which includes a first pressure chamber 41 and a second pressure chamber 42.

Referring now to FIGS. 1 and 2, a first air conduit 51 communicates with first pressure chamber 41 and a second air conduit 52 communicates with second pressure chamber 42. Conduit 51 extends to a first three-way solenoid valve 61 and conduit 52 extends to a second three-way solenoid valve 62. Both valves 61 and 62 are connected, through conduit 63, with pressure regulator 64 which supplies a constant air pressure to pipe 63 from an external air supply source 67 (mill air supply, e.g.). Solenoid valves 61, 62 are normally open and are responsive, in a way later described, either to direct air under pressure through conduit 51 to chamber 41 and through conduit 52 to chamber 42 or to be closed and to open the chambers to exhaust, thus to control the movement of piston head 36 and the axial movement of the rods 32, 38 secured thereto. Each valve 61, 62 includes in its exhaust port a bleeder needle valve 65, 66, respectively, these needle valves being responsive to energization of solenoid valves 61 or 62, to allow air to exhaust slowly from chambers 41 or 42 when pressure is applied to the opposite chamber. Thus, when both valves 61 and 62 are open, the pressures in chambers 41 and 42 are equal, and there is no movement of piston head 36. When one of valves 61 and 62 is closed and its respective chamber opened to exhaust a pressure differential is created which moves piston head 36 in the direction of the chamber which has been opened to exhaust. The rate of exhaust may be controlled by adjusting needle valves 65, 66 and hence the rate of movement of piston head 36 controlled.

Piston assembly 34 is secured to base plate 68 by brackets 69, 70 on piston end plates 71, 72 respectively. Base plate 68 also supports housing 75 which supports sensing assembly 76.

Sensing assembly 76 includes an arm 78 slidable in a guide supported on plate 68 beside an edge of the web. Arm 78 carries at its end adjacent the web a sensing head 82 for sensing the position of the web edge as between two operating zones and an intermediate nul zone. Head 82 may be a photocell or pressure change sensor of conventional type which translates light or pressure detection greater or less than that which determines the nul zone into electrical output for activating the solenoids 61, 62 respectively, or other suitable type. As shown it is a photocell type and includes a pair of U-shaped sensor units 84, 86 having rearward slotted extensions by which they are mounted side by side on bracket 88 on arm 78 by bolts 90 passing through the slots and fastened in the bracket. Each of the units 84, 86 has in the opposite branches of the U, a photocell and a light source (not shown). By loosening bolts 90 and slidably adjusting units 84, 86 the distance laterally of the web between their respective photocells, which forms the nul zone, may be varied. Arm 78 suports units 84, 86 in position to surround the adjacent edge of the web.

A pin 92 is fixed to arm 78 and extends through elongated slot 94 of crank arm 96. A shaft 98 has an end secured in bore 100 of crank arm 96 by threaded set screw 102. Shaft 98 is rotatably mounted in housing 75 and has its other end fixed to an end of a crank arm 104 which is pivotally mounted adjacent its other end on a linkage arm 106 by pivot assembly 108 which is adjustably fastened in ratio slot 110 in arm 104 by bolt 112 and nut 114.

Feedback linkage arm 106 terminates in spherical rod end 116 into which rotatably extends feedback linking pin 118 which is secured to feedback bar 120. Piston rod 38 is secured to block 122 on feedback bar 120.

A.C. solenoids 61 and 62 (FIG. 3) are respectively connected in series with relay-activated normally open contact pair 124 and normally closed contact pair 126 (shown in the open position since as is described below the corresponding relay is normally activated) and 110 volts A.C. applied across each solenoid and its respective contact pair.

Contact pair 124 is arranged to be closed by a relay (not shown) energized over line 128 when movement of the web edge away from arm 78 permits the light source in unit 84 to energize the photocell therein. When the web either is in the nul zone or has travelled out of the nul zone away from arm 78, the light source in unit 86 energizes a second relay (not shown) over line 130 and the second relay, when energized, opens (to the position shown in FIG. 3) normally closed contact pair 126. During operation, contact pair 126 is arranged to be closed when the web edge moves toward arm 78 and prevents the light source in unit 86 from energizing the photocell therein, thus de-energizing the second relay, which closes contact pair 126.

In operation when there is lateral movement of web 14 away from arm 78 and out of the nul zone, the light source in unit 84 energizes the photocell therein and contact pair 124 is closed, energizing solenoid 61. Chamber 41 is opened to exhaust and piston head 36 is driven by the greater air pressure in chamber 42 toward chamber 41. The piston assembly causes appropriate counter-clockwise pivoting of roller shaft 16 and block 18 (FIG. 1), for moving web 14 back toward its original position. Solenoid 62 remains de-energized and allows air from source 67 to maintain the pressure in chamber 42.

At the same time feedback bar 120 is moved by piston rod 38 laterally toward arm 78, causing, through linking arm 106 and cam arm 104, a counter-clockwise rotation of shaft 98 and, therefore, of crank arm 96 about a pivot point central to shaft 98. Elongated slot 94 will thus bear against pin 92 and cause pin 92 to slide along slot 94 away from shaft 98, this combined motion serving to push arm 78 toward web 14, and in thus following web 14, re-align the nul zone of the sensor with the web edge, de-activating solenoid 61 and permitting the air pressure in chamber 41 to become equal to that in chamber 42. Travel of web 14 in a direction toward the sensing assembly will cause contact pair 126 to become closed and similar piston, roller, and feedback movements opposite to that described above will take place.

The valve and piston arrangement described, as compared to one in which, for example, compressed air from the source is permitted to enter one of the chambers only after detection of movement of the web edge from the nul zone and not during normal operation—is particularly advantageous in applications in which relatively small corrective loads and movements are required. By maintaining the chambers under equal pressure when the web edge is in the nul zone, departures of the web edge may be corrected quickly by immediately opening one of the chambers to exhaust and shutting off the source therefrom to create a pressure differential which moves the piston head, rather than waiting for an initially exhausted chamber to receive enough air from the supply to move the head.

In addition, in apparatus in which only one cylinder is pressurized and the other has been exhausted, the piston head and, therefore, the adjustment mechanism often display a tendency to overcorrect since the rate of exhaust from the pressurized chamber and the pressure in the exhausted chamber toward which the piston head is moving are insufficient to stop the piston head when the sensing head senses that the web edge has returned to the nul zone. Furthermore, in a system of the latter kind, a chamber which has been pressurized must be exhausted after a corrective movement has been made and refilled when another corrective movement in the same direction is required, thus consuming substantially more compressed air than does the valve and piston arrangement described in the first embodiment.

What is claimed is:

1. Apparatus for controlling the operation of a device for regulating registry of a traveling web with equipment operating thereon which comprises:

operating means for connection to said device to produce opposite regulatory adjustments thereof;

detector means associated with the web for detecting opposite movements thereof requiring opposite adjustment operations of said device;

said detector means including a detector arm mounted for sliding movement at the side of the web, a shaft mounted for rotational movement adjacent said arm, linkage connecting said arm and said shaft so that a said movement of said shaft causes a proportional said movement of said arm, and a detector element having two operating zones and a nul zone fixedly mounted on said arm and arranged to detect said opposite web movements from a position of reference to said nul zone;

means connecting said operating zones of said detector element to said operating means to produce said opposite regulatory adjustments thereof respectively when the web moves from said position of reference to said nul zone to a position of reference to a said operating zone and until return of the web to a position of reference to said nul zone; and feedback means connected to said shaft and operative in response to adjustment operation of said operating means to rotate said shaft and thereby to slide said arm in direction and amount proportional to said adjustment operation to return said nul zone of said detector element to the said position of reference of the web thereto upon termination of movement of the web in direction away from such position.

2. Apparatus according to claim 1 wherein said detector element includes means for adjusting the width of said nul zone.

3. Apparatus according to claim 1 wherein said operating means includes an oppositely movable pressure controlled piston connected to produce said adjustments of said device and said feedback means includes a bar connected to said piston to move therewith and a link pivotally connecting said bar to said shaft for rotation of said shaft in accordance with movement of said bar.

4. Apparatus according to claim 3 wherein said link is adjustably connected to an arm on said shaft so that the extent of rotation of said shaft by movement of said bar may be varied.

5. Apparatus according to claim 1 wherein said operating means includes an oppositely movable, pressure controlled piston connected to produce said adjustments of said device and electrically operated valve means connected between opposite sides of said piston and a source of fluid under pressure, and said detector element is a photoelectric sensor connected to operate said valve means.

6. Apparatus according to claim 1 wherein said operating means includes an oppositely movable, pressure controlled piston connected to produce said adjustments of said device and electrically operated valve means connected between opposite sides of said piston and a source of fluid under pressure, said oppositely movable, pressure controlled piston including a piston head disposed within a cylinder, said piston head being arranged to define two chambers containing said fluid under pressure within said cylinder on said opposite sides of said piston, and being responsive to fluid pressure differences between said chambers to move toward the chamber having the lower fluid pressure, said valve means being arranged to connect said source to either or both of said chambers, and to exhaust one of said chambers when the other of said chambers is connected to said source and being responsive to said detector means to connect both said chambers to said source and to equalize said fluid pressures in said chambers when said web is in said position of reference to said nul zone or to connect one of said chambers to said source, to exhaust the other of said chambers, and to create pressure differences arranged to move said piston head for producing said opposite regulatory adjustments of said operating means when said web moves to a said position of reference to one of said operating zones.

References Cited

UNITED STATES PATENTS 3,504,835  4/1970  Callan _____ 226—23

ALLEN N. KNOWLES, Primary Examiner

G. A. CHURCH, Assistant Examiner